United States Patent [19]

Miwa et al.

[11] Patent Number: 5,391,630
[45] Date of Patent: Feb. 21, 1995

[54] COATING COMPOSITION CURABLE AT A LOW TEMPERATURE

[75] Inventors: Hiroshi Miwa, Itami; Yoshitaka Okude, Hirakata; Katsumi Mizuguchi, Suita; Hidefumi Okuda, Toyonaka, all of Japan

[73] Assignee: Nippon Paint Co., Ltd., Osaka, Japan

[21] Appl. No.: 110,760

[22] Filed: Aug. 23, 1993

Related U.S. Application Data

[63] Continuation of Ser. No. 145,628, Jan. 15, 1988, abandoned.

[30] Foreign Application Priority Data

Jan. 16, 1987 [JP] Japan .................................. 62-8786
Jan. 16, 1987 [JP] Japan .................................. 62-8787

[51] Int. Cl.$^6$ ............................................. C08F 8/46
[52] U.S. Cl. .................................... 525/285; 525/195; 525/207; 525/328.8; 525/380; 525/386
[58] Field of Search ............ 515/195, 207, 285, 380, 515/386

[56] References Cited

U.S. PATENT DOCUMENTS 3,632,546  1/1972  Haung et al. .
4,058,497  11/1977  Ko et al. .
4,182,840  1/1980  Meyer et al. ........................ 525/437

*Primary Examiner*—Bernard Lipman
*Attorney, Agent, or Firm*—Wenderoth, Lind & Ponack

[57] ABSTRACT

Disclosed is a coating composition curable at a low temperature, comprising (A) a hydroxyl-containing compound, (B) a metal chelate compound or a metal alcoholate compound and (C) a compound having an acid anhydride group. The composition further comprises a chelate-forming compound (D) and/or a tertiary amine (E).

7 Claims, No Drawings

COATING COMPOSITION CURABLE AT A LOW TEMPERATURE

This application is a continuation application of now abandoned application, Ser. No. 07/145,628, filed Jan. 15, 1988, now abandoned.

FIELD OF THE INVENTION

The present invention relates to a coating composition which is curable at a low temperature and provides coatings having excellent durability. The coating composition is particularly suitable for autobiles, plastics and electric elements.

BACKGROUND OF THE INVENTION

There has been known a paint for automobiles which generally contains an acrylic polyol or polyester polyol, and a melamine resin as a curing agent. The paint is required to cure at a temperature of 130° to 180° C. for 10 to 30 minutes. The curing temperature is too high to apply to thermoplastic materials, such as synthetic plastics. It also requires a high energy cost.

A two-pack urethane paint containing an isocyanate as a crosslinking agent has also been used for repairing automobiles. The paint is short in pot-life and therefore inconvenient for actual application. Also, in this paint, the isocyanate having a low molecular weight remains in a cured film and causes toxicity.

It is desired that a coating composition can be cured at a low temperature, for example, 50° to 150° C. without using isocyanates to obtain a highly crosslinked film.

BRIEF EXPLANATION OF PRIOR ART

Japanese Patent Publication (unexamined) No. 2798/1975 discloses that a curable coating composition comprises an epoxy resin, an acid anhydride being as a curing agent, and a reaction product of a metal chelate compound of beta-diketone, an acid anhydride and a cyclic ether. The composition, however, is poor in reactivity and therefore has to be cured at about 90° C. for 16 hours and then cured at 130° C. for 24 hours. The composition is difficult to obtain a cured product having desired physical properties when cured at a low temperature for a short period of time.

Japanese Patent Publication (unexamnied) No. 100869/1981 discloses that a small amount of a metal hydroxide is mixed with a composition composed of an acylic copolymer or alkyd resin having a carboxyl group in molecule, an aluminum alcoholate complex, a keto-enol tautomerism compound and a solvent to obtain a one-pack coating composition curable at ambient temperature. The cured film of this coating composition is still poor in solvent resistance if cured at a low temperature for a short period of time.

SUMMARY OF THE INVENTION

The present invention is to provide a coating composition curable at a low temperature, comprising (A) a hydroxyl-containing compound, (B) a metal chelate compound or a metal alcoholate compound and (C) a compound having an acid anhydride group. The composition further comprises a chelate-forming compound (D) and/or a tertiary amine (E).

It is generally believed that a metal chelate compound is reacted with a carboxyl group or hydroxyl group of a polymer to form a chemical bond with the polymer through oxygen. But it is difficult to form such a chemical bond between the metal chelate compound and an oligomeric material, such as a polymer for a coating composition because of a steric hindrance of the oligomeric material. According to the present invention, the acid anhydride is inserted between the metal and the polymer so as to reduce the steric hindrance, whereby the curing reaction is promoted to enhance curing properties.

The storage stability of the coating composition is also improved by adding the chelate-forming compound which prevents an attack of the acid anhydride at room temperature.

Once the composition is heated, the chelate-forming compound is distilled away to begin the above mentioned reaction mechnism by the acid anhydride. When the tertiary amine is added to the composition, curing is further accelerated to make it possible to cure at a low temperature. The cured film obtained from the coating composition of the present invention is excellent in solvent resistance, acid resistance, alkali resistance and impact resistance, and also provided improved appearance.

DETAILED DESCRIPTION OF THE INVENTION

Component (A)

The hydroxyl-containing compound (A) of the present invention is one either having a high molecular weight or a low molecular weight, preferably it has plural hydroxyl groups. Concrete examples of the hydroxyl-containing compounds (A) are low molecular weight diols, polyester resins, acrylic resins, silicon resins and polybutadiene resins and a mixture thereof. The low molecular weight diols include ethylene glycol, propylene glycol, 1,6-hexanediol, diethylene glycol, 1,5-pentanediol and the like; higher functional polyols, such as neopentyl glycol, glycerol, trimethylolpropane and the like. Examples of the polyester resins are oil free alkyd, long oil alkyd, short oil alkyd, ultra-long oil alkyd and middle oil alkyd. The acrylic resins include acrylpolyol, styrene-containing acrylpolyol, CAB-modified acrylpolyol, alkyd-modified acrylpolyol, NC-modified acrylpolyol, oil free alkyd-modified acrylpolyol and the like. The silicone resins include silanol-terminated methylsilicone, silanol-terminated alkylsilicone, silanol-terminated phenylsilicone, silanol-terminated methylphenylsilicone and the like. Examples of the polybutadiene resins are hydroxyl-terminated polybutadiene and the like. It is preferred that the hydroxyl group is primary, especially exists at a terminal. A secondary or tertiary hydroxyl group can be existent, but it is not preferred due to steric hindrance. The hydroxyl-containing compound (A) may also have another functional group. Such functional groups include those having tertiary amino group, such as triethanol amine and tripropanolamine. Since the tertiary amino group has function of curing promotion, the compound having it acts as a curing promoter, too. It is preferred that the hydroxyl-containing compound (A) has a hydroxyl value of 40 to 200, preferably 60 to 150. If the hydroxyl value is more than 200, flexibility of the cured film is deteriorated to often cause crack. Values less than 40 are short of crosslinking degree.

Component (B)

The metal chelate compound or a metal alcoholate compound (B) of the present invention includes an aluminum compound, such as aluminum tris(ethylacetoacetate), aluminum tris(acetylacetonate), aluminum-di-n-butoxidemonoethylacetatoacetate, aluminum-di-n-butoxidemonoethylacetoacetate, aluminum-diisobutoxidemonomethylacetoacetate and the like; a titanium compound, such as di-isopropoxy-bis(acetylacetone) titanate, di-n-butoxy-bis(triethanolamine) titanate, dihydroxy-bis(lactic acid) titanate, tetraoctylene glycol titanate and the like; zirconium compound, such as zirconium tetra(acetylacetonate), zirconium acetate, zirconium laurate and the like; a cobalt compoud, such as cobalt bis(acetylacetonate), cobalt oxalate and the like; a zinc compound, such as zinc salicylate, zinc benzoate, zinc oleate, zinc stearate and the like; a nickel compound, such as nickel bisacetylacetonate, nickel dimethylglyoxium, nickel oxalate and the like; a iron compound, such as iron tris(acetylacetonate), iron tris-(ethylacetoacetate) and the like; and a mixture thereof. Preferred are the aluminum or zirconium compound because they are substantially no color. An amount of the metal chelate compound or a metal alcolate compound (B) is 0.1 to 3.0 equivalent, preferably 0.3 to 1.0 equivalent in terms of metal, based on one equivalent of the hydroxyl group of the hydroxyl-containing compound (A). Amounts outside of the above range deteriorate the cured film in physical properties. The compound (B) perticipates in crosslinking reaction through the acid anhydride infra.

Component (C)

The compoud having an acid anhydride group (C) employed in the present invention is one known to the art, for example, a low molecular weight acid anhydride, such as maleic anhydride, phthalic anhydride, hydrogenated phthalic anhydride, 4-methylhydrogenated phthalic anhydride, pyromellitic anhydride, pyromellitic anhydride triglyceride, pyromellitic anhydride ethyleneglycol ester and a mixture thereof; a polymeric acid anhydride, such as a copolymer of an ethylenic acid anhydride (such as itaconic anhydride and maleic anhydride) and an alpha, beta-ethylenic monomer; and the like. The acid value of the polymeric acid anhydride is within the range of 30 to 500, preferably 50 to 350. If the compound having an anhydride group (C) (hereinafter referred to as "acid anhydride") is classified primary, secondary and tertiary in connection with the anhydride group, a secondary or tertiary acid anhydride is preferred for obtaining high crosslinking degree. Preferred is pyromellitic anhydride triglyceride, pyromellitic anhydride ethyleneglycol ester, and a hydrogenated one thereof, or the polymeric acid anhydride. The acid anhydride (C) enhances reactivity of the compound (B) to accelerate the curing reaction. The polymeric acid anhydride is easily dissolved with the other components of the present invention. This further enables to cure at a lower temperature if the tertiary amine infra is added. An amount of the acid anhydride is within the range of 0.1 to 10.0 equivalent, preferably 0.5 to 2.0 equivalent in terms of an amount of the acid anhydride group, based on one equivalent of the hydroxyl group of the hydroxyl-containing compound (A). Amounts outside of the above range deteriorate the cured film in physical properties.

Component (D)

The coating composition of the present invention may contain the chelate-forming compound (D). The compound (D) forms a chelate compound with the metal of the compound (B) to inhibit a reaction of the metal with the acid anhydride group at room temperature. Representative examples of the compounds are keto-enol tautomerism compounds, such as acetylacetone, benzoylacetone, dibenzoylacetone, ethyl acetoacetate, methyl acetoacetate, butyl acetoacetate, dimethyl malonate diethyl malonate, dibutyl malonate and the like. The compound (D) may be formulated in the coating composition of the present invention in an amount of 0.5 to 5 equivalent, preferably 1 to 3 equivalent based on one equivalent of the hydroxyl group of the hydroxyl-containing compound (A). If it is less than 0.5 equivalent, the storage stability of the coating composition becomes poor. If it is more than 5 equivalent, it is difficult to cure at a low temperature.

Component (E)

The tertiary amine (E) employed in the present invention is added to promote the curing reaction. It is preferred that the tertiary amine is volatile at a low temperature. Preferred amines include triethylamine, tripropylamine, tributylamine and the like. It may be formulated in the coating composition in an amount of 0.01 to 1.5 equivalent, preferably 0.1 to 1.0 equivalent based on one equivalent of the hydroxyl group of the hydroxyl-containing compound (A). Amounts less than 0.01 equivalent decline the physical properties of the cured film. The amine can be added in an amount more than 1.5 equivalent, but the technical effects are not obtained in proportion to the amount.

The other components

The above components may be mixed to form a clear paint or mixed with a pigment to form an enamel paint. The pigment can be any conventional one, for example, iron oxide, lead oxide, strontium chromate, carbon black, coal dust, titanium oxide, talc, balium sulfate, cadmium yellow, cadmium red, chromium yellow, a metal pigment (such as aluminum flake) and the like.

The pigment content in the paint is usually expressed as a weight ratio of pigment/nonvolatile content of the coating composition. In the process of the present invention, the weight ratio can be as high as 2: 1, typically is between 0.05 to 1: 1.

The coating composition of the present invention generally contains a liquid diluent. The liquid diluent is a solvent or nonsolvent which is removed after applying and reduces the viscosity so that it is coated in a controlled thickness by a simple coating method, such as spray coating. The liquid diluent also assists wetting properties of a substrate, miscibility, package stability, coalescent properties and film-forming properties. Suitable examples of the diluents are an aromatic hydrocarbon, such as toluene and xylene; a ketone, such as methyl ethyl ketone and methyl isobutyl ketone; an alcohol, such as isopropyl alcohol and n-butyl alcohol; a monoether of glycol, such as ethylene glycol monoetther and diethylene glycol monoether; a monoether glycol acetate, such as 2-ethoxyethyl acetate; and a suitable mixture thereof. The diluent may be present in the coating composition in an amount of up to 60% by weight, generally 20 55% by weight based on the total amount of the diluent and the novolatile content of the coating composition.

Beside the above components, an additive, such as filler, a plasticizer, an antioxidation egent, a ultraviolet absorber, a flow controlling agent, a surfactant and the like can be added if desirable. An amount of the additive is varied widely, generally up to 10% by weight based on the nonvolatile content of the coating composition.

The coating composition may be applied on a substrate by spray coating, blushing, dipping, roll coating, flow coating and the like. The substrate to be employed includes wood, metal, glass, fablic, plastics, foam or various primer-coated substrate. The coating composition is very suitable for plastics or metal, such as steel and aluminum.

After the coating composition has been applied, it is cured. Curing can be carried out various temperature including ambient temperature, at a low temperature, especially 50° to 150° C. preferably 60° to 100° C. to obtain a highly crosslinked film. The time for curing is varied by the curing temperature, but is generally at 60° to 100° C. for 10 to 30 minutes.

The coating composition may be one packed according to the reactivity of the components (A) to (E), if possible and generaly be two packed. In case of two pack type, the component (A) must not be mixed with the component (C), because the both components have high reactivity with each other.

EXAMPLES

The present invention is illustrated by the following examples, which, however, are not to be construed as limiting the present invention to their details. All parts and percentage in the examples are by weight unless otherwise specified.

EXAMPLE 1

First, 100 parts of a white pigment (available from Nippon Paint Co. Ltd. as Nax mightylac G-II, which is a mixture of a titanium pigment and an acrylol resin having a hydroxyl value of 100 and an acid value of 0); 20 parts of a 50% solution of aluminum tirs(ethylacetoacetate) in toluene and 25 parts of a 33% solution of trimellitic anhydride triglyceride in dioxane were mixed to form a coating composition. The composition was diluted with a 50/50 mixture of toluene and butyl acetate and spray-coated on a phosphate-pretreated steel panel. It was baked at 100° C. for 30 minutes. The obtained coating was evaluated and the result is shown in Table 2.

EXAMPLE 2

A mixture was prepared by mixing 9.0 parts of Al-paste 1100 NA (an aluminum pigment paste having 65% nonvolatile content available from Toyo Aluminum Company) with 79.0 parts of an acryl resin solution (available from Hitachi Chemical Co. Ltd. as Hitaloyd 44-127) followed by addition of 10.7 parts of toluene and 1.3 parts of Disperone 4200-10 (a suspension stabilizer available from Kusumoto Chemical Company) and mixing for 10 minutes. Then, 15 parts of a 50% solution of aluminum tirs(ethylacetoacetate) in toluene and 20 parts of a 33% solution of trimellitic anhydride triglyceride in dioxane were added to the resultant mixture to form a coating composition. The composition was diluted with a solvent mixture of 10 parts of toluene, 20 parts of butyl acetate, 50 parts of xylene and 20 parts of Solvesso #100 (an aromatic hydrocarbon solvent available from Exxon Company) to #4 Ford Cup viscosity (20° C.) of 13 seconds and spray-coated on a phosphate-pretreated steel panel. After 3 minutes, a clear paint was further spray-coated thereon in wet-on-wet fashion. The clear paint was prepared by mixing 100 parts of Acryl Dic A801 (available from Dainippon Ink and Chemicals, Inc.), 20 parts of a 50% solution of aluminum tirs(ethylacetoacetate) in toluene and 20 parts of a 33% solution of trimellitic anhydride triglyceride in dioxane and then diluting with the above solvent mixture to #4 Ford Cup viscosity (20° C.) of 22 second. The coated panel was baked at 100° C. for 30 minutes. The obtained coating was evaluated and the result is shown in Table 2.

EXAMPLE 3

First, 70 parts of rutile type titanium oxide and 40 parts of xylene were added to 50 parts of Phthalkyd 133-60 (available from Hitachi Chemical, Co. Ltd. is an alkyl polyol resin having a hydroxyl value of 145) and dispersed by a paint agitater for 45 minutes. To the resultant mixture was added 70 parts of Phthalkyd 133-60 and 20 parts of xylene. Then, 40 parts of a 50% solution of aluminum tirs(ethylacetoacetate) in toluene and 25 parts of a 33% solution of trimellitic anhydride triglyceride in dioxane were added and diluted with a 50/50 mixture of toluene and butyl acetate and spray-coated on a phosphate-pretreated steel panel. It was baked at 100° C. for 30 minutes. The obtained coating was evaluated and the result is shown in Table 2.

EXAMPLE 4

A coated panel was formed as generally described in Example 1 with the exception that 30 parts of a 10% solution of trimellitic anhydride ethylene glycol ester in dioxane was employed instead of 25 parts of the 33% solution of trimellitic anhydride triglyceride in dioxane. The obtained coating was evaluated and the result is shown in Table 2.

EXAMPLE 5

A coated panel was formed as generally described in Example 1 with the exception that 8 parts of 4-methyl-hydrogenated phthalic acid was employed instead of 25 parts of the 33% solution of trimellitic anhydride triglyceride in dioxane. The obtained coating was evaluated and the result is shown in Table 2.

EXAMPLE 6

A coated panel was formed as generally described in Example 1 with the exception that 40 parts of a 20% solution of aluminum tris(acetylacetonate) in benzene was employed instead of 20 parts of the 50% solution of aluminum tris(ethylacetoacetate) in toluene. The obtained coating was evaluated and the result is shown in Table 2.

EXAMPLE 7

A coated panel was formed as generally described in Example 1 with the exception that 50 parts of a 10% solution of zirconium tetra(acetylacetonate) in toluene/isopropyl alcohol of 85/1 was employed instead of 20 parts of the 50% solution of aluminum tris(ethylacetoacetate) in toluene. The obtained coating was evaluated and the result is shown in Table 2.

EXAMPLE 8

A coated panel-was formed as generally described in Example 1 with the exception that 10 parts of a 70% solution of tetraoctylene glycol titanate in isopropanol was employed instead of 20 parts of the 50% solution of aluminum tris(ethylacetoacetate) in toluene. The obtained coating was evaluated and the result is shown in Table 2.

EXAMPLES 9 TO 13

A coated panel was formed as generally described in Example 4 with the exception that amounts of the components were changed as shown in Table 1. The obtained coating was evaluated and the result is shown in Table 2.

TABLE 1

| Examples number | 9 | 10 | 11 | 12 | 13 |
|---|---|---|---|---|---|
| Nax mightylac G-II White | 100 | 100 | 100 | 100 | 100 |
| 50% solution of Aluminum tris(ethylacetoacetate) in toluene | 20 | 20 | 20 | 10 | 30 |
| 10% solution of Trimellitic anhydride triglyceride | 10 | 20 | 40 | 30 | 30 |

Comparative Example 1

A coated panel was formed as generally described in Example 1 with the exception that 25 parts of the 33% solution of trimellitic anhydride triglyceride in dioxane was not employed. The obtained coating was evaluated and the result is shown in Table 2.

Comparative-Example 2

A coated panel was formed as generally described in Example 2 with the exception that trimellitic anhydride triglyceride was not employed in the metallic coating composition and the clear paint. The obtained coating was evaluated and the result is shown in Table 2.

Comparative Example 3

A coated panel was formed as generally described in Example 3 with the exception that trimellitic anhydride triglyceride was not employed. The obtained coating was evaluated and the result is shown in Table 2.

TABLE 2

| Examples number | Resistance to[1] solvents | Resistance to[2] acids | Resistatnce to[3] alkalis | Resistance to[4] impact | Pencil[5] hardness | Resistance to[6] accelerated weather | Appearrance[7] |
|---|---|---|---|---|---|---|---|
| 1 | No defects | No defects | No defects | Not less than 50 cm | 3H | 92 | No defects |
| 2 | No defects | No defects | No defects | Not less than 50 cm | H | 91 | No defects |
| 3 | No defects | No defects | No defects | Not less than 50 cm | H | 82 | No defects |
| 4 | No defects | No defects | No defects | Not less than 50 cm | 2H | 85 | No defects |
| 5 | Slightly blister | No defects | No defects | Not less than 50 cm | H | 70 | Slightly dull |
| 6 | Slightly blister | No defects | No defects | Not less than 50 cm | H | 78 | No defects |
| 7 | Slightly blister | No defects | No defects | Not less than 50 cm | 2H | 73 | Slightly dull |
| 8 | No defects | No defects | No defects | Not less than 50 cm | 2H | 69 | Slightly dull |
| 9 | Slightly blister | No defects | No defects | Not less than 50 cm | HB | 77 | No defects |
| 10 | No defects | No defects | No defects | Not less than 50 cm | 2H | 88 | No defects |
| 11 | No defects | No defects | No defects | Not less than 50 cm | 2H | 86 | No defects |
| 12 | Slightly blister | No defects | No defects | Not less than 50 cm | H | 78 | No defects |
| 13 | No defects | No defects | No defects | Not less than 50 cm | F | 75 | No defects |
| Comparative Example | | | | | | | |
| 1 | Blister | Blister | Blister | 30 cm | B | 43 | Dull |
| 2 | Blister | Blister | Whitening | 10 cm | 3B | 46 | Dull |
| 3 | Blister | Blister | Blister | 40 cm | 2B | 38 | Dull |

1) Film after immersing in gasoline for 24 hours.
2) Film after immersing in a 5% HCl solution for 24 hours.
3) Film after immersing in a 10% NaOH solution for 24 hours.
4) Du Pont method: 500 g ½ inches.
5) A pencil available from Mitsubishi Pencil Company as Uni.
6) 60° Gloss retention after exposing 1000 hours by Sunshine Weather O Meter.
7) Visual appearance after exposing 1000 hours by Sunshine Weather O Meter.

Production Example 1

Synthesys of plymer I containing a carboxyl anhydride group

A one liter reaction vessel equipped with a thermometer, an agitater, a condenser and a nitrogen inlet was charged with 120 parts of butyl acetate and heated to 100° C. A solution containing 21 parts of n-butyl acrylate, 95 parts of n-butyl methacrylate, 34 parts of 2-ethylhexyl methacrylate, 45 parts of itaconic anhydride, 60 parts of dioxane and 10 parts of t-butylperoxy hexanoate was added dropwise over 3 hours and further mixed for 2 hours to obtain an acryl resin having a nonvolatile content of 53% and a number average molecular weight of 5,500.

Prodution Example 2 to 5

Synthesys of polymers II to V containing a carboxyl anhydride group

Polymer containing a carboxyl anhydride group were obtained as generally described in Example but using the components shown in Table 3.

TABLE 3

| Production examples number | 2 | 3 | 4 | 5 |
| --- | --- | --- | --- | --- |
| Butyl acetate | 100 | 120 | 100 | 100 |
| Xylene | 20 | — | 20 | — |
| Butylene | 10 | — | 50 | — |
| methyl methacrylate | — | 30 | 35 | — |
| Butyl acrylate | 80 | 30 | 30 | 8 |
| 2-ethylhexyl methacrylate | 45 | 60 | 15 | 45 |
| Ethyl methacrylate | 15 | — | — | — |
| Ethyl acrylate | — | 45 | 25 | 15 |
| Itaconic anhydride | 45 | 30 | 40 | 55 |
| Dioxane | 50 | 50 | 50 | 70 |
| Kayer-0* | 7 | 10 | — | — |
| AIBN** | — | — | 8 | 2 |
| Nonvolatile content | 52 | 53 | 52 | 52 |
| Number-average molecular weight | 7,000 | 5,000 | 4,000 | 12,000 |

*Kayer-0; t-Buthyl-peroxy-2-ethyl hexanoate
**AIBN; azobisisobutyronitrile

EXAMPLES 14

A clear paint was prepared by mixing 120 parts of the polymer I, 7 parts of 1,5-pentanediol, 12 parts of triethylamine and 35 parts of a 50% solution of aluminum tris(ethylacetoacetate) in toluene. The paint was diluted with a 1/1 mixture of butyl acetate and xylene and coated on a phospate-pretreated steel panel by a doctor blade. The coated panel was baked at 80° C. for 30 minutes. The cured film was evaluated for pencil hardness and solvent resistance, of which result is shown in Table 5.

EXAMPLES 15 to 29

A clear paint was prepared as generally described in Example 14 but using the amounts and components shown in Table 4. The paint was coated and cured in a similar manner as Example 14 and the resultant film was evaluated. The result is shown in Table 5.

Comparative Examples 4

A clear paint was prepared as generally described in Example 14 with the exception that 12 parts of triethylamine was not formulated. The paint was coated and cured in a similar manner as Example 14 and the resultant film was evaluated. The result is shown in Table 5.

Comparative Examples 5

A clear paint was prepared as generally described in Example 14 with the exception that 35 parts of the 50% solution of aluminum tris(ethylacetoacetate) was not formulated. The paint was coated and cured in a similar manner as Example 14 and the resultant film was evaluated. The result is shown in Table 5.

TABLE 4

| Examples number | Compound containing carboxyl anhydride (parts by weight) | Metal chelate or metal alcholate (parts by weight) | Hydroxyl-containing compound (parts by weight) | Tertiary amine (parts by weight) |
| --- | --- | --- | --- | --- |
| 15 | Polymer I (128) | 50% Solution of aluminum tris(acetylacetate) in toluene (32) | Diethylene glycol (8) | Triethylamine (20) |
| 16 | Polymer I (124) | 50% Solution of aluminum tris(acetylacetate) in toluene (32) | Acryl polymer 1 (150) | Triethylamine (12) |
| 17 | Plymer II (128) | 50% Solution of aluminum tris(acetylacetate) in toluene (29) | 1,6-Hexanediol (8) | Triethylamine (12) |
| 18 | Polymer III (128) | 50% Solution of aluminum tris(ethylacetoacetate) in toluene (25) | Triethanolamine (4.5) | — |
| 19 | Polymer IV (124) | 50% Solution of aluminum tris(acetylacetate) in toluene (33) | Tripropanolamine (8) | — |
| 20 | Polymer V (123) | 50% Solution of aluminum tris(ethylacetoacetate) in toluene (39) | Trimethylolpropane (5.5) | Triethylamine (14) |
| 21 | Polymer I (128) | 50% Solution of aluminum tris(ethylacetoacetate) in toluene (35) | 1,5-Pentandiol (7) | Triethylamine (8) |
| 22 | Polymer I (128) | 50% Solution of aluminum tris(ethylacetoacetate) in toluene (35) | 1,5-Pentandiol (3) | Triethylamine (11) |
| 23 | Polymer I (128) | 50% Solution of aluminum tris(ethylacetoacetate) in toluene (35) Ethyl acetoacetate (15) | 1,5-Pentandiol (7) | Triethylamine (12) |
| 24 | Polymer I (128) | 50% Solution of aluminum tris(ethylacetoacetate) in toluene (15) | Triethanolamine (6.5) | — |
| 25 | Polymer I (128) | 30% Solution of Aluminum isopropoxide in benzen (22) | Diethylene glycol (8) | Triethylamine (12) |
| 26 | 33% Torimellitic anhydride ethylene glycol in dioxan (80) | 50% Solution of aluminum tris(ethylacetoacetate) in toluene (35) | Trimethylolpropane (7) | Triethylamine (10 |
| 27 | Polymer I (128) | 30% Solution of aluminum isopropoxide Acryl | (160) | Triethylamine (8) |

TABLE 4-continued

| Examples number | Compound containing carboxyl anhydride (parts by weight) | Metal chelate or metal alcholate (parts by weight) | Hydroxyl-containing compound (parts by weight) | Tertiary amine (parts by weight) |
|---|---|---|---|---|
| 28 | Polymer I (128) | polymer in benzen (22) 30% Solution of aluminum isopropoxide Acryl polymer in benzen (22) | (50) | Triethylamine (8) |
| 29 | 33% Torimellitic anhydride ethylene glycol in Dioxan (80) | 50% Solution of aluminum tris(ethylacetoacetate) in toluene (35) | Trimethylolpropane (7) | Triethylamine (10) |

TABLE 5

| | Example | | | | | | | | | | | | | | | | Comparative Example | |
|---|---|---|---|---|---|---|---|---|---|---|---|---|---|---|---|---|---|---|
| | 14 | 15 | 16 | 17 | 18 | 19 | 20 | 21 | 22 | 23 | 24 | 25 | 26 | 27 | 28 | 29 | 4 | 5 |
| Pencil hardness | H | H | 2H | H | 2H | 2H | 2H | H | H | H | 2H | H | F | 2H | H | F | 4B | 2B |
| Resistance to solvents 24 Hours in gasoline) | good | good | good | good | good | good | good | good | good | good | good | good | good | good | good | good | bad | bad |

EXAMPLE 30

A reaction vessel equipped with a thermometer, a agitater, a condenser, a nitrogen inlet and a dropping funnel was charged with 40 parts of xylene and 50 parts of butyl acetate and heated to 120° C. A solution of 30 parts of styrene, 23 parts of 2-hydroxyethyl mathacrylate, 10 parts of methyl methacrylate, 17 parts of butyl methacrylate, 20 parts of butyl acrylate and 3 parts of t-butylperoxy-2-ethyl hexanoate was added dropwise for 3 hours and then maintained at 120° C. for 30 minutes. Next, a solution of 0.5 parts of t-butylperoxy-2-ethyl hexanoate and 10 parts of xylene was added dropwise for one hour and maintained at 120° C. for 2 hours followed by terminating the reaction to obtain a transparent resin solution having a solid content of about 50%. The resin solution has a Gardner viscosity of O—P at 25° C.

Twenty parts of a 50% solution of aluminum tris(ethylacetoacetate) in toluene, 20 parts of a 33% solution of trimellitic anhydride triglyceride in dioxane and 20 parts of acetylacetone were added to 100 parts of the resin solution obtained above to form a clear paint. The clear paint was tested for storage stability by allowing to stand for 3 months at room temperature and no changes were seen.

A white enamel was prepared by adding 45 parts of rutile type titanium oxide to 66.6 parts of the above obtained clear paint and dispersed by a roll. The enamel was spray-coated on a phosphate-pretreated steel panel and baked at 100° C. for 30 minutes. The cured coating was evaluated as Example 1 and its result is shown in Table 7.

EXAMPLE 31

A mixture was prepared by mixing 9.0 parts of Alpaste 1100 NA (an aluminum pigment paste having 65% nonvolatile content available from Toyo Aluminum Company) with 79.0 parts of an acryl resin solution (available from Hitachi Chemical Co. Ltd. as Hitaloyd 44-127) followed by addition of 10.7 parts of toluene and 1.3 parts of Disperone 4200-10 (a suspension stabilizer available from Kusumoto Chemical Company) and mixing for 10 minutes. Then, 15 parts of a 50% solution of aluminum tirs(ethylacetoacetate) in toluene, 20 parts of a 33% solution of trimellitic anhydride triglyceride in dioxane, 20 parts of acetylacetone and 10 parts of ethyl acetoacetate were added to the resultant mixture to form a metallic paint. The paint was tested for storage stability at room temperature and no changes were seen for 3 months.

The metallic paint and the clear paint were diluted with a solvent mixture of 10 parts of toluene, 20 parts of butyl acetate, 50 parts of xylene and 20 parts of Solvesso #100 (an aromatic hydrocarbon solvent available from Exxon Company) and spray-coated on a phosphate-pretreated steel panel in wet-on-wet fashion. The coated panel was baked at 100 ° C. for 30 minutes. The obtained coating was evaluated and the result is shown in Table 7.

EXAMPLES 32 TO 36

A clear paint was prepared as generally described in Example 30 but using the amounts and components shown in Table 6. The paint was tested for storage stability at room temperature and no changes were seen for 30 days.

The paint was coated as generally described in Example 30 to obtain a cured coating of which evaluations is shown in Table 7.

TABLE 6

| | Examples | | | | | |
|---|---|---|---|---|---|---|
| | 32 | 33 | 34 | 35 | 36 | 37 |
| Reaction solvent | | | | | | |
| Xylene | 70 | 70 | 70 | 70 | 70 | 70 |
| Methyl isobutyl-ketone | 20 | — | — | 10 | 10 | — |
| Butyl Acetate | — | 20 | — | 10 | — | 10 |
| n-Butanol | — | — | 20 | — | 10 | 10 |

TABLE 6-continued

| | Examples | | | | | |
|---|---|---|---|---|---|---|
| | 32 | 33 | 34 | 35 | 36 | 37 |
| Monomer | | | | | | |
| Stylene | 30 | 30 | 30 | 35 | 35 | 35 |
| Metyl methacrylate | 10 | 10 | 10 | 10 | 10 | 10 |
| Butyl methacrylate | 20 | 20 | 20 | 20 | 20 | 20 |
| Butyl acrylate | 17 | 17 | 17 | 7 | 7 | 6.5 |
| 2-Hydroxyethyl-methacrylate | 23 | 23 | 23 | 28 | 28 | 28 |
| Acrylic acid | — | — | — | — | — | 0.5 |
| 1st initiator | | | | | | |
| t-butylperoxy-2-ethyl hexanoate | 3.0 | 3.0 | 3.0 | 4.0 | 4.0 | 4.0 |
| 2nd initiator | | | | | | |
| t-butylperoxy-2-ethyl hexanoate | 0.5 | 0.5 | 0.5 | 0.5 | 0.5 | 0.5 |
| Xylene | 10 | 10 | 10 | 10 | 10 | 10 |
| Chelate-forming compound (parts by weight) | Acetylacetone (20) | Ethyl aceto-acetate (20) | Methyl aceto-acetate (20) | Diethyl malonate (20) | Benzoylacetone (20) | Acetylacetone (20) |
| Aluminum chelate (parts by weight) | 25% Solution of aluminum tris isopropoxide in toluen (45) | 25% Solution of aluminum trisisopropoxide in toluene (50) | 50% Solution of aluminum tris(ethyl-acetonceiate) in toluene 40 | 50% Solution of aluminum tris(ethyl-acetiacetate) in toluene (50) | 50% Solution of ethylacetate Aluminum diisopropylale in toluene (50) | 50% Solution of ethylacetate Aluminum diisopropylate in toluene (50) |
| Acid anhydride (parts by weight) | 15% Solution of trimellitic anhydride diglyceride in acetone (60) | 15% Solution of trimellitic anhydride diglyceride in acetone (60) | 15% Solution of trimellitic anhydride diglyceride in acetone (60) | 15% Solution of trimellitic anhydride diglyceride in acetone (60) | 15% Solution of trimellitic anhydride diglyceride in acetone (60) | 15% Solution of trimellitic anhydride diglyceride in acetone (60) |

TABLE 7

| | Example | | | | | | |
|---|---|---|---|---|---|---|---|
| | 30 | 31 | 32 | 33 | 34 | 35 | 36 |
| Storage stability (Room temperature) | 30 days good | 30 days good | 30 days good | 30 days good | 30 days good | 30 days good | 30 days good |
| Curing conditions | 100° C. × 30 min | 100° C. × 30 min | 100° C. × 30 min | 100° C. × 30 min | 100° C. × 30 min | 100° C. × 30 min | 100° C. × 30 min |
| Gloss (60° C.) | 92 | 95 | 94 | 95 | 94 | 95 | 94 |
| PCD value | 0.8 | 0.7 | 0.8 | 0.7 | 0.7 | 0.8 | 0.7 |
| Pencil hardness (Mitsubishi UNI) | 2H | 3H | 2H | 2H | 3H | 2H | 2H |
| Resistance to solvents (24 hours in gasoline) | good | good | good | good | good | good | good |
| Visual appearance | good | good | good | good | good | good | good |

EXAMPLES 37

A clear paint was prepared by mixing 128 parts of the polymer I, 7 parts of 1,5-pentanediol, 12 parts of triethylamine, 35 parts of a 50% solution of aluminum tris(ethylacetoacetate) in toluene and 20 parts of ethyl acetoacetate. The paint was diluted with a 1/1 mixture of butyl acetate and xylene and coated on a phospate-pretreated steel panel by a doctor blade. The coated panel was baked at 80° C. for 30 minutes. The cured film was evaluated for pencil hardness and solvent resistance, of which result is shown in Table 9.

EXAMPLE 38 TO 52

A clear paint was prepared as generally described in Example 37 but using the amounts and components shown in Table 8. The paint was coated and cured in a similar manner as Example 37 and the resultant film was evaluated. The result is shown in Table 9.

TABLE 8

| Examples number | Compound containing carboxylic anhydride (parts by weight) | Metal chelate or metal alcholate (parts by weight) | Hydroxyl-containing compound (parts by weight) | Tertiary amine (parts by weight) | Chelete-forming compound (parts by weight) |
|---|---|---|---|---|---|
| 38 | Production example 1 (128) | 50% Toluene solution of aluminum tris-(acetylacetate) (32) | Diethylene glycol (8) | Triethylamine (20) | Acetylacetone (25) |
| 39 | Production examle 1 (128) | 50% Toluene solution of aluminum tris-(acetylacetate) (32) | Acryl polyol* (200) | Triethylamine (12) | Ethyl acetoacetate (30) |
| 40 | Production example 2 (124) | 50% Toluene solution of aluminum tris-(acetylacetate) (29) | 1,6-Hexandiol (8) | Triethylamine (12) | Acetylacetone (22) |
| 41 | Production example 3 | 50% Toluene solution of aluminum tris(e- | Triethanolamine (4.5) | — | Ethyl acetoacetate (30 |

TABLE 8-continued

| Examples number | Compound containing carboxylic anhydride (parts by weight) | Metal chelate or metal alcholate (parts by weight) | Hydroxyl-containing compound (parts by weight) | Tertiary amine (parts by weight) | Chelete-forming compound (parts by weight) |
|---|---|---|---|---|---|
| | (125) | thylacetoacetate) (25) | | | |
| 42 | Production example 4 (124) | 50% Toluene solution of aluminum tris(ethylacetoacetate) (33) | Tripaopanolamine (7) | — | Acetylacetone (35) |
| 43 | Production example 5 (123) | 50% Toluene solution of aluminum tris(ethylacetoacetate) (39) | Trimethylolpropane (5.5) | Triethylamine (14) | Diethyl malonate (25) |
| 44 | Production example 1 (128) | 50% Toluene solution of aluminum tris(ethylacetoacetate) (35) | 1,5-Pentandiol (7) | Triethylamine (8) | Diethyl malonate (20) |
| 45 | Production example 1 (128) | 50% Toluene solution of aluminum tris(ethylacetoacetate) (35) | 1,5-Pentadiol (3) | Triethylamine (11) | Ethyl acetoacetate (30) |
| 46 | 33% Dioxane solution of trimellitic anhydride diethylene glycol (128) | 50% Toluene solution of aluminum tris(ethylacetoacetate (35) | Acryl polyol (180) | Triethylamine (2) | Ethyl acetoacetate (30) |
| 47 | Production exmaple 1 (128) | 50% Toluene solution of aluminum tris(ethylacetoacetate (15) | Triethanolamine (6.5) | — | Acetylacetone (25) |
| 48 | Production example 1 (128) | 30% Benzen solution of aluminum isopropoxide (22) | Diethyleneglycol (8) | Triethylamine (12) | Acetylacetone (25) |
| 49 | 33% Dioxane solution of trimellitic anhydride ethylene glycol (80) | 50% Toluene solution of aluminum tris-(ethylacetoacetate) (35) | Trimethylolpropane (7) | Triethylamine (10) | 4-Hydroxy-2-pentanone (30) |
| 50 | Production example 1 (128) | 30% Benzene solution of aluminum isopropoxide (22) | Aclyl polyol (120) | Tributylamine (14) | 4-Hydroxy-2-pentanone |
| 51 | Production example 1 (128) | 30% Benzene solution of aluminum isopropoxide (22) | Aclyl polyol (120) | Triethylamine (5) | 4-Hydroxy-2-pentanone (30) |
| 52 | 33% Dioxane solution of trimellitic anhydride ethylenc glycol (80) | 50% Benzene solution of aluminum isopropoxide (35) | Trimethylolpropane (8) | Triethylamine (8) | 4-Hydroxy-2-pentanone (30) |

*A copolymer having a number averarage molecular weight of 8,000 and a nonvolatile content of 54%, prepared by copolymerising 40 parts of styrene, 30 parts of methyle methacrylate, 40 parts of butyl acrylate, 30 parts of 2-ethylhexyl mathacrylate, 30 parts of ethyl methacrylate and 30 parts of hydroxyethyl methacrylate.

TABLE 9

| | Example | | | | | | | | |
|---|---|---|---|---|---|---|---|---|---|
| | 37 | 38 | 39 | 40 | 41 | 42 | 43 | 44 | 45 |
| Pencil hardness | H | H | 2H | H | 2H | 2H | 2H | H | H |
| Resistance to solvents (24 Hours in gasoline) | Good | Good | Good | Good | Good | Good | Good | Good | Good |
| Paint pot-life (room temperature) | Good for 24 h. | Good for 24 h. | Good for 24 h. | Good for 24 h. | Good for 24 h. | Good for 24 h. | Good for 24 h. | Good for 24 h. | Good for 24 h. |
| | | 46 | 47 | 48 | 49 | 50 | 51 | 52 | |
| | Pencil hardness | H | 2H | H | F | 2H | H | H | |
| | Resistance to solvents (24 Hours in gasoline) | Good | Good | Good | Good | Good | Good | Good | |
| | Paint pot-life (room temperature) | Good for 24 h. | Good for 24 h. | Good for 18 h. | Good for 24 h. | Good for 18 h. | Good for 18 h. | Good for 18 h. | |

What is claimed is

1. A coating composition curable at a low temperature, comprising:
(A) an acrylpolyol resin;
(B) a metal chelate compound or a metal alcoholate compound selected from the group consisting of aluminum tris(ethylacetoacetate), aluminum tris-(acetylacetonate), aluminum-di-n-butoxidemonoethylacetatoacetate, aluminum-di-n-butoxidemonoethylacetatoacetate, aluminum-diisobutoxidemonoethylacetatoacetate, di-isopropoxy-bis(acetylacetone) titanate, di-n-butoxy-bis(triethanolamine) titanate, dihydroxy-bis(lactic acid) titanate, tetraoctylene glycol titanate, zirconium tetra(acetylacetonate), zirconium acetate, zirconium laurate, cobalt bis(acetylacetonate), cobalt oxalate, zinc salicylate, zinc benzoate, zinc oleate, zinc stearate, nickel bisacetylacetonate, nickel dimethylglyoxium, nickel oxalate, iron tris(acetylacetonate) and iron tris(ethylacetoacetate);

(C) a compound having an acid anhydride group having an acid value of 30 to 500 selected from the group consisting of maleic anhydride, phthalic anhydride, hydrogenated phthalic anhydride, 4-methyl-hydrogenated phthalic anhydride, pyromellitic anhydride, pyromellitic anhydride triglyceride, pyromellitic anhydride ethyleneglycol ester and mixtures thereof; said metal chelate compound or metal alcoholate compound (B) being present in an amount of 0.1 to 3.0 equivalents in terms of metal, based on one equivalent of the hydroxyl group of the acrylopolyol resin (A), and wherein the acid anhydride (C) is present in an amount of 0.1 to 10.0 equivalents in terms of an amount of the acid anhydride group, based on one equivalent of a hydroxyl group of the acrylpolyol resin.

2. The coating composition of claim 1 which further contains a chelate-forming compound (D) selected from the group consisting of acetylacetone, benzoylacetone, dibenzoylacetone, ethyl acetoacetate, methyl acetoacetate, butyl acetoacetate, dimethyl malonate, diethyl malonate and dibutyl malonate and is present in an amount of 0.5 to 5 equivalent, based on one equivalent of the hydroxyl group of the hydroxyl-containing compound.

3. The coating composition according to claim 1 which further contains a tertiary amine (E) as a curing promoter selected from the group consisting of triethylamine, tripropylamine and tributylamine and is present in an amount of 0.01 to 1.5 equivalent, based on one equivalent of a hydroxyl group of the acrylpolyol resin (A).

4. The coating composition according to claim 1 in which the acid anhydride is selected from the group consisting of pyromellitic anhydride, pyromellitic anhydride triglyceride, a pyromellitic anhydride ethyleneglycol ester and mixtures thereof.

5. The coating composition according to claim 1 in which the acid anhydride is a copolymer of itaconic anhydride.

6. The coating composition of claim 4 in which component (B) is aluminum tris(ethylacetoacetate).

7. The coating composition of claim 4 in which the metal chelate compound is selected from the group consisting of aluminum tris(ethylacetoacetate), aluminum tris(acetylaceltonate), aluminum-di-n-butoxidemonoethylacetatoacetate, aluminum-di-n-butoxidemonoethylacetatoacetate and aluminum-diisobutoxidemonoethylacetatoacetate.

* * * * *